(12) United States Patent
Higa

(10) Patent No.: US 12,175,646 B2
(45) Date of Patent: Dec. 24, 2024

(54) ABNORMALITY DETECTION APPARATUS, CONTROL METHOD, AND PROGRAM

(71) Applicant: NEC Corporation, Tokyo (JP)

(72) Inventor: Kyota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 460 days.

(21) Appl. No.: 17/441,374

(22) PCT Filed: Mar. 27, 2019

(86) PCT No.: PCT/JP2019/013239
§ 371 (c)(1),
(2) Date: Sep. 21, 2021

(87) PCT Pub. No.: WO2020/194583
PCT Pub. Date: Oct. 1, 2020

(65) Prior Publication Data
US 2022/0180495 A1 Jun. 9, 2022

(51) Int. Cl.
*G06T 7/00* (2017.01)

(52) U.S. Cl.
CPC .. *G06T 7/0002* (2013.01); *G06T 2207/30184* (2013.01)

(58) Field of Classification Search
CPC ......... G06T 7/0002; G06T 2207/30184; G06T 2207/20076; G06T 2207/20081; G06T 2207/20084; G06N 3/0455; G06N 20/00; G06N 3/08; G06N 3/088; G06N 20/10; G06N 3/02
See application file for complete search history.

(56) References Cited

U.S. PATENT DOCUMENTS

| 2017/0323437 A1* | 11/2017 | Takimoto | G06V 10/32 |
| 2018/0157249 A1* | 6/2018 | Muto | G06V 40/20 |

(Continued)

FOREIGN PATENT DOCUMENTS

| JP | 2008-234651 A | 10/2008 |
| JP | 2018-024055 A | 2/2018 |

(Continued)

OTHER PUBLICATIONS

English Translation of JP-6749655-B1, "Inspection Device, Abnormality Detection Method, Computer Program, Learning Model Generation Method, and Learning Model" filed on Mar. 19, 2019 and published on Sep. 2, 2020. (Year: 2020).*

EnglishTranslation of JP-2018120300-A, "Information Processing Apparatus, Information Processing Method, and Program" filed on Jan. 23, 2017 and published on Aug. 2, 2018 (Year: 2018).*

(Continued)

*Primary Examiner* — Gandhi Thirugnanam

(57) ABSTRACT

An abnormality detection apparatus (100) includes an acquisition unit (110) that acquires input data, an abnormality degree computation unit (120) that has a discriminative model for computing an abnormality degree of input data, inputs the acquired input data to the discriminative model, and thereby computes an abnormality degree of the input data, a normality degree computation unit (130) that has a normality model for computing a normality degree of input data, inputs the input data to the normality model, and thereby computes a normality degree of the input data, a determination unit (140) that has a determination model for performing determination relating to an abnormality level of input data, inputs the abnormality degree and the normality degree to the determination model, and thereby performs determination relating to an abnormality level of the input data, and an output unit (150) that outputs output information based on a result of the determination.

9 Claims, 10 Drawing Sheets

(56) References Cited

U.S. PATENT DOCUMENTS

| | | | |
|---|---|---|---|
| 2018/0211374 A1* | 7/2018 | Tanaka | G06V 10/945 |
| 2019/0210176 A1 | 7/2019 | Yamamoto | |
| 2020/0401943 A1* | 12/2020 | Kawachi | G06F 18/2415 |
| 2022/0075693 A1* | 3/2022 | Mitani | G06F 11/1415 |
| 2022/0180495 A1* | 6/2022 | Higa | G06T 7/0002 |
| 2022/0237060 A1* | 7/2022 | Okanohara | G06N 7/00 |
| 2022/0254006 A1* | 8/2022 | Jin | G06V 10/764 |
| 2023/0215152 A1* | 7/2023 | Kaneko | G06V 10/7715 |
| | | | 382/159 |
| 2024/0177293 A1* | 5/2024 | Tatemizo | G06T 7/70 |

FOREIGN PATENT DOCUMENTS

| | | | | |
|---|---|---|---|---|
| JP | 2018-074757 A | | 5/2018 | |
| JP | 2018120300 A | * | 8/2018 | G06K 9/6253 |
| JP | 6749655 B1 | * | 9/2020 | |

OTHER PUBLICATIONS

International Search Report for PCT Application No. PCT/JP2019/013239, mailed on Jul. 2, 2019.

Alec Radford et al., "Unsupervised Representation Learning with Deep Convolutional Generative Adversarial Networks", ICLR (International Conference on Learning Representations), San Juan, Puerto Rico, May 2-4, 2016.

Ito, Hidemasa et al., "Deep Learning Data Augmentation Technique to Improve Image Recognition Accuracy". Toshiba Review. vol. 72, No. 4, Sep. 26, 2017, pp. 18-21.

Nagaba, Keiko et al., "Sexy Technology: Toshiba Launches Novel Deep Learning for Transmission Line Inspections—New AI 'Generation Model' can be Considered a 'Creator' Utilizing 'Intelligence'"(non-official translation), Nikkei Robotics, No. 21, Apr. 2017, pp. 3-9.

* cited by examiner

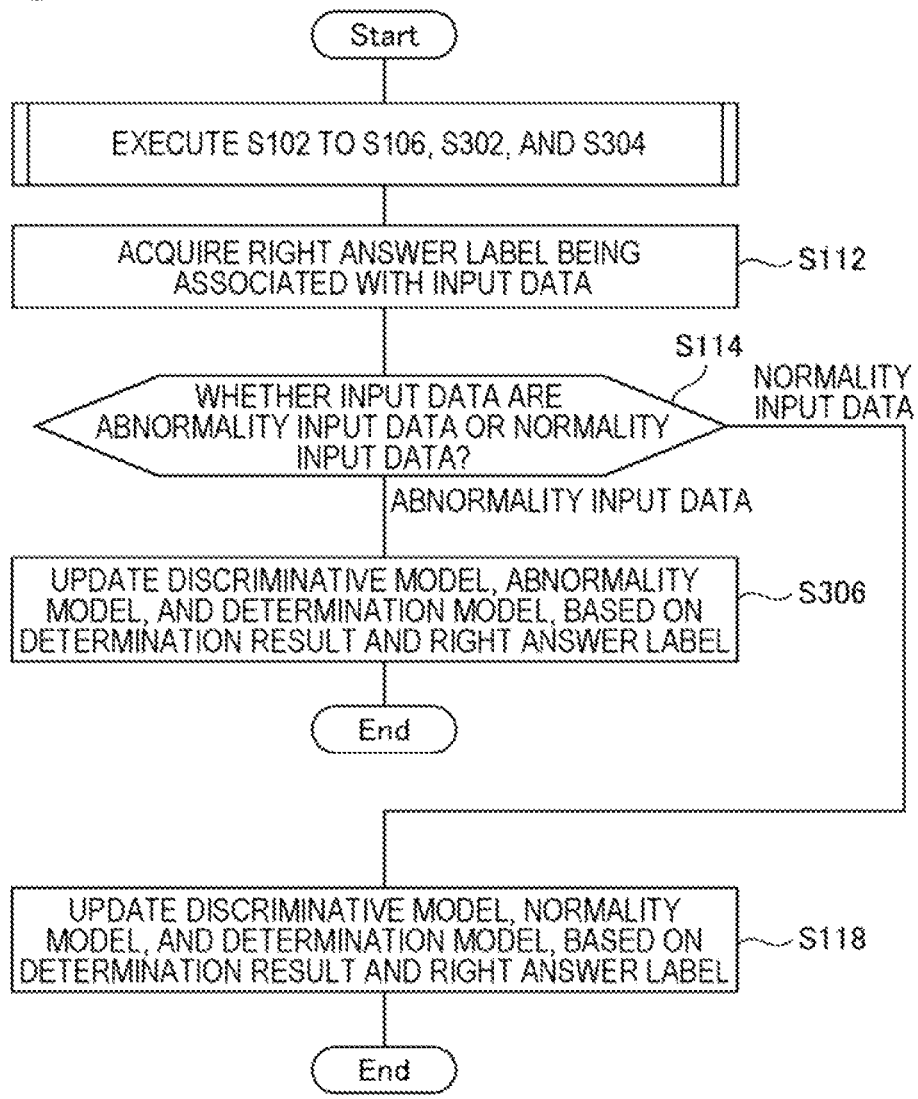

ABNORMALITY DETECTION APPARATUS, CONTROL METHOD, AND PROGRAM

This application is a National Stage Entry of PCT/JP2019/013239 filed on Mar. 27, 2019, the contents of all of which are incorporated herein by reference, in their entirety.

TECHNICAL FIELD

The present invention relates to abnormality detection.

BACKGROUND ART

With advance of decrease in working population, there has been a rise in a desire to support by an image recognition technique or automate work such as a check or inspection performed by a skilled maintenance worker. In image recognition, it is necessary to improve recognition accuracy by performing learning of a discriminator or the like by using a large amount of images for learning collected at a scene. However, since an abnormal state is generally low in occurrence frequency, it is difficult to collect a sufficient amount of images for learning.

Patent Document 1 discloses a technique for detecting, as an abnormality, an arc mark produced by lightning striking an overhead ground wire or a power line. Herein, since it is difficult to acquire a large amount of image data of an actually produced arc mark, a pseudo image is generated, based on image data capturing a state of an abnormality or deterioration added to a check target in a pseudo manner. Then, an abnormality detection model is generated by deep learning utilizing not only image data on an actually produced arc mark but also the pseudo image.

RELATED DOCUMENT

Patent Document

[Patent Document 1] Japanese Patent Application Publication No. 2018-74757

Non-Patent Document

[Non-Patent Document 1] Alec Radford, Luke Metz, Soumith Chintala, "Unsupervised Representation Learning with Deep Convolutional Generative Adversarial Networks", ICLR 2016

SUMMARY OF THE INVENTION

Technical Problem

There are a large variety of features (e.g., a color, a shape, and the like) indicating a state of an abnormality. It is difficult for the invention according to Patent Document 1 to handle data including such a large variety of features.

The present invention has been made in view of the problem described above, and one object thereof is to provide a technique for improving accuracy of abnormality detection.

Solution to Problem

An abnormality detection apparatus according to the present invention includes: 1) an acquisition unit that acquires input data; 2) an abnormality degree computation unit that has a discriminative model for computing an abnormality degree of input data, inputs the acquired input data to the discriminative model, and thereby computes an abnormality degree of the input data; 3) a normality degree computation unit that has a normality model for computing a normality degree of input data, inputs the acquired input data to the normality model, and thereby computes a normality degree of the input data; 4) a determination unit that has a determination model for performing determination relating to an abnormality level of the input data, inputs data being output from each of the discriminative model and the normality model to the determination model, and thereby performs determination relating to an abnormality level of the acquired input data; and 5) an output unit that outputs output information based on a result of the determination.

A control method according to the present invention is executed by a computer. The control method includes: 1) an acquisition step of acquiring input data; 2) an abnormality degree computation step of having a discriminative model for computing an abnormality degree of input data, computing an abnormality degree of the input data; 3) a normality degree computation step of having a normality model for computing a normality degree of input data by inputting the acquired input data to the discriminative model, computing a normality degree of the input data by inputting the acquired input data to the normality model; 4) a determination step of having a determination model for performing determination relating to an abnormality level of the input data, performing determination relating to an abnormality level of the acquired input data by inputting data being output from each of the discriminative model and the normality model to the determination model; and 5) an output step of outputting output information based on a result of the determination.

A program according to the present invention causes a computer to execute each step included in the control method according to the present invention.

Advantageous Effects of Invention

According to the present invention, a technique for improving accuracy of abnormality detection is provided.

BRIEF DESCRIPTION OF THE DRAWINGS

The above-described object, the other objects, features, and advantages will become more apparent from a suitable example embodiment described below and the following accompanying drawings.

FIG. 10 is a flowchart illustrating a flow of processing executed by the abnormality detection apparatus according to the example embodiment 3 during learning.

DESCRIPTION OF EMBODIMENTS

Example embodiments according to the present invention are described below by use of the drawings. Note that, a similar reference sign is assigned to a similar component in all the drawings, and description is omitted accordingly. Moreover, unless otherwise specially described, each block represents, in each block diagram, not a configuration on a hardware basis but a configuration on a function basis.

Example Embodiment 1

Figure 1:
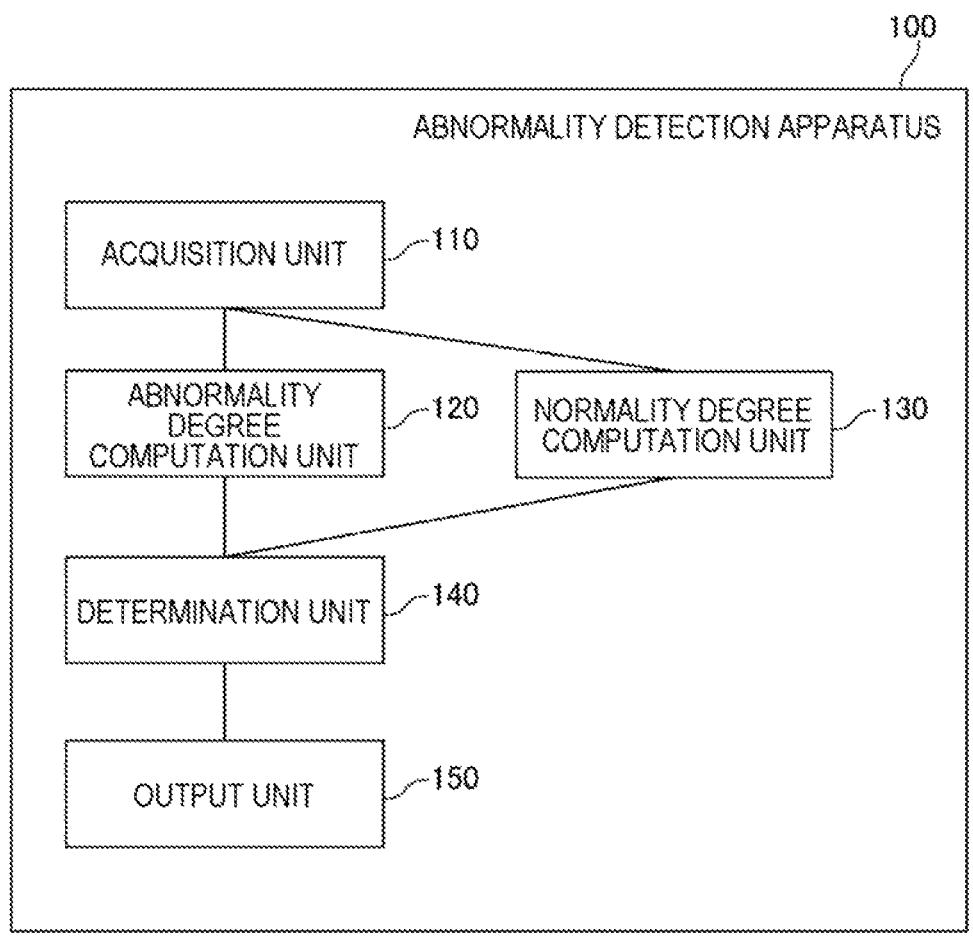
FIG. 1 is a block diagram illustrating one example of a functional configuration of an abnormality detection apparatus according to an example embodiment 1.

FIG. 1 is a block diagram illustrating one example of a functional configuration of an abnormality detection apparatus 100 according to an example embodiment 1. The abnormality detection apparatus 100 according to the present example embodiment includes an acquisition unit 110, an abnormality degree computation unit 120, a normality degree computation unit 130, a determination unit 140, and an output unit 150.

The acquisition unit 110 acquires input data. The input data is data to be a target of abnormality detection by the abnormality detection apparatus 100. For example, the input data is an image. In this case, for example, the abnormality detection apparatus 100 analyzes an image being the input data, and thereby determines whether the image represents a normal situation or an abnormal situation. For example, when an object is included in an image, whether the object is in an abnormal situation (at fault, or the like) or in a normal situation is determined.

The abnormality degree computation unit 120 computes an abnormality degree of the input data (a value representing a degree of abnormality of the input data) acquired by the acquisition unit 110. Then, the abnormality degree computation unit 120 supplies the computed abnormality degree to the determination unit 140. The abnormality degree computation unit 120 computes an abnormality degree of the input data by using a discriminative model. The discriminative model is learned by using at least input data representing an abnormal situation (hereinafter, abnormality input data). However, input data representing a normal situation (hereinafter, normality input data) may be further used for learning of the discriminative model. The discriminative model is achieved by any model such as a binary classifier or a multinomial classifier being capable of classifying input data into two or more kinds. One more specific example of a discriminative model is a convolutional neural network.

The normality degree computation unit 130 computes a normality degree of the input data (a value representing a degree of normality of the input data) acquired by the acquisition unit 110. Then, the normality degree computation unit 130 supplies the computed normality degree to the determination unit 140. The normality degree computation unit 130 computes a normality degree of the input data by using a normality model. The normality model is learned by only normality input data. The normality model is achieved by any model being capable of extracting any feature included in input data. One more specific example of a normality model is an autoencoder.

The determination unit 140 acquires an abnormality degree of input data from the abnormality degree computation unit 120. Moreover, the determination unit 140 acquires a normality degree of input data from the normality degree computation unit 130. Then, the determination unit 140 performs determination relating to an abnormality level of the input data by using the abnormality degree and the normality degree of input data, and generates determination data representing a result of the determination. For example, the determination unit 140 determines whether the input data represent an abnormal situation or a normal situation. In this case, the determination data indicate whether the input data represent an abnormal situation or a normal situation. As a more specific example, a piece of the determination data is a flag indicating "1" when the input data is determined as representing an abnormal situation, and indicating "0" when the input data is determined as representing a normal situation.

However, the determination model may be a determination model that does not classify input data into normality and abnormality but determine a degree of abnormality or a degree of normality of the input data. In this case, a piece of determination data represents a degree of abnormality or a degree of normality of the input data.

A determination model is achieved by any model such as a binary classifier or a multinomial classifier being capable of classifying input data into two or more kinds. One more specific example of a determination model is a neural network.

The output unit 150 outputs output information based on determination data. For example, output information is the very determination data. In addition, for example, output information may be a replacement of determination data in a format easy to understand for a person. Specifically, it is assumed that a value of determination data is 1, and thereby represents a situation where input data is abnormal. In this case, a character string such as "abnormality" being easy to understand for a person may be indicated as output information, instead of indicating a value "1".

An output aspect of output information may be any output aspect. For example, output information may be output to a display apparatus, may be transmitted to another apparatus, or may be stored in a storage apparatus.

<Advantageous Effect>

As described above, the abnormality detection apparatus 100 according to the present example embodiment computes an abnormality degree of input data by using a discriminative model, and computes a normality degree of the input data by using a normality model. Further, determination relating to an abnormality level of the input data is performed by using the determination model, based on the abnormality degree and the normality degree. In this way, the abnormality detection apparatus 100 according to the present example embodiment can extract a large variety of features from any input data, and perform determination (i.e., abnormality detection) regarding an abnormality level of the input data, based on the feature, by combining a plurality of models differing in purpose. Thus, accuracy of abnormality detection can be improved.

<Example of Hardware Configuration>

Each functional configuration unit of the abnormality detection apparatus 100 may be achieved by hardware (example: a hard-wired electronic circuit, or the like) that achieves each functional configuration unit, or may be achieved by a combination of hardware and software (example: a combination of an electronic circuit and a program controlling the electronic circuit, or the like). A case where each functional configuration unit of the abnormality detection apparatus 100 is achieved by a combination of hardware and software is further described below.

Figure 2:
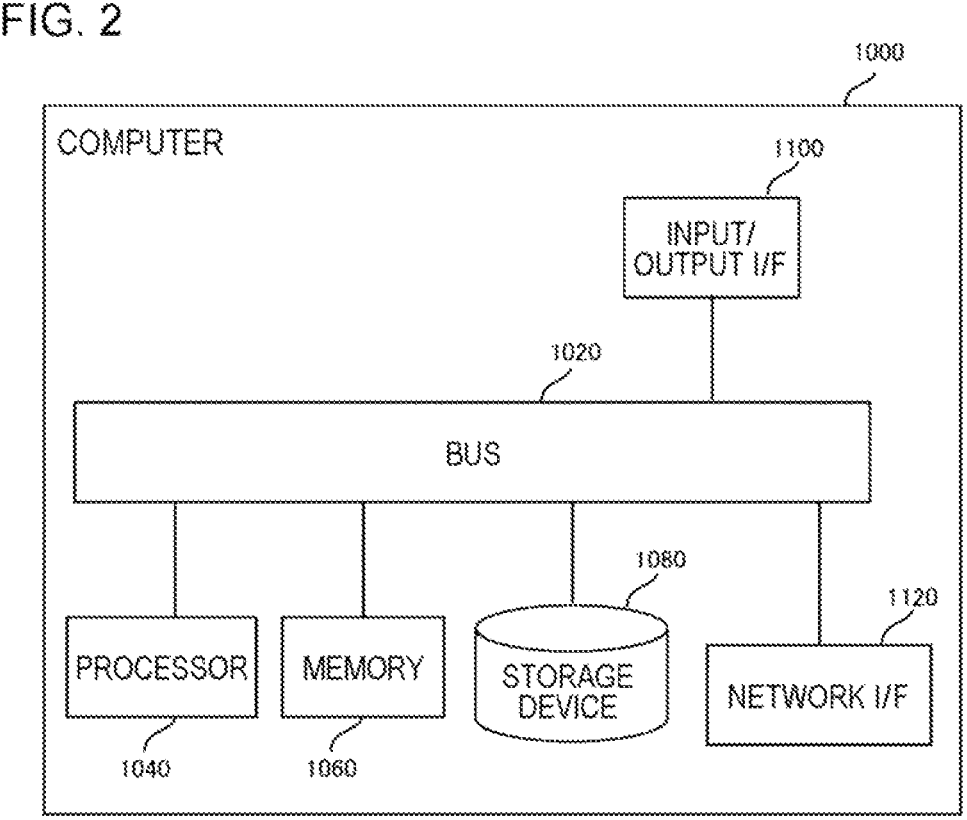
FIG. 2 is a diagram illustrating a computer for achieving the abnormality detection apparatus.

FIG. 2 is a diagram illustrating a computer 1000 for achieving the abnormality detection apparatus 100. The computer 1000 is any computer. For example, the computer 1000 is a personal computer (PC), a server machine, a tablet terminal, a smartphone, or the like. The computer 1000 may be a dedicated computer designed to achieve the abnormality detection apparatus 100, or may be a general-purpose computer.

The computer 1000 includes a bus 1020, a processor 1040, a memory 1060, a storage device 1080, an input/output interface 1100, and a network interface 1120. The bus 1020 is a data transmission path through which the processor 1040, the memory 1060, the storage device 1080, the input/output interface 1100, and the network interface 1120 transmit/receive data to/from each other. However, a method of mutually connecting the processor 1040 and the like is not limited to bus connection. The processor 1040 is a processor such as a central processing unit (CPU), a graphics processing unit (GPU), or a field-programmable gate array (FPGA). The memory 1060 is a main storage apparatus achieved by use of a random access memory (RAM) or the like. The storage device 1080 is an auxiliary storage apparatus achieved by use of a hard disk drive, a solid state drive (SSD), a memory card, a read only memory (ROM), or the like. However, the storage device 1080 may be configured by hardware, such as a RAM, similar to hardware configuring the main storage apparatus.

The input/output interface 1100 is an interface for connecting the computer 1000 and an input/output device. The network interface 1120 is an interface for connecting the computer 1000 to a communication network. The communication network is, for example, a local area network (LAN) or a wide area network (WAN). A method of connecting the network interface 1120 to the communication network may be wireless connection or may be wired connection.

The storage device 1080 stores a program module that achieves a functional configuration unit of the abnormality detection apparatus 100. The processor 1040 reads each of the program modules onto the memory 1060, executes the read program module, and thereby achieves a function being associated with each of the program modules.

<Flow of Processing>

Figure 3:
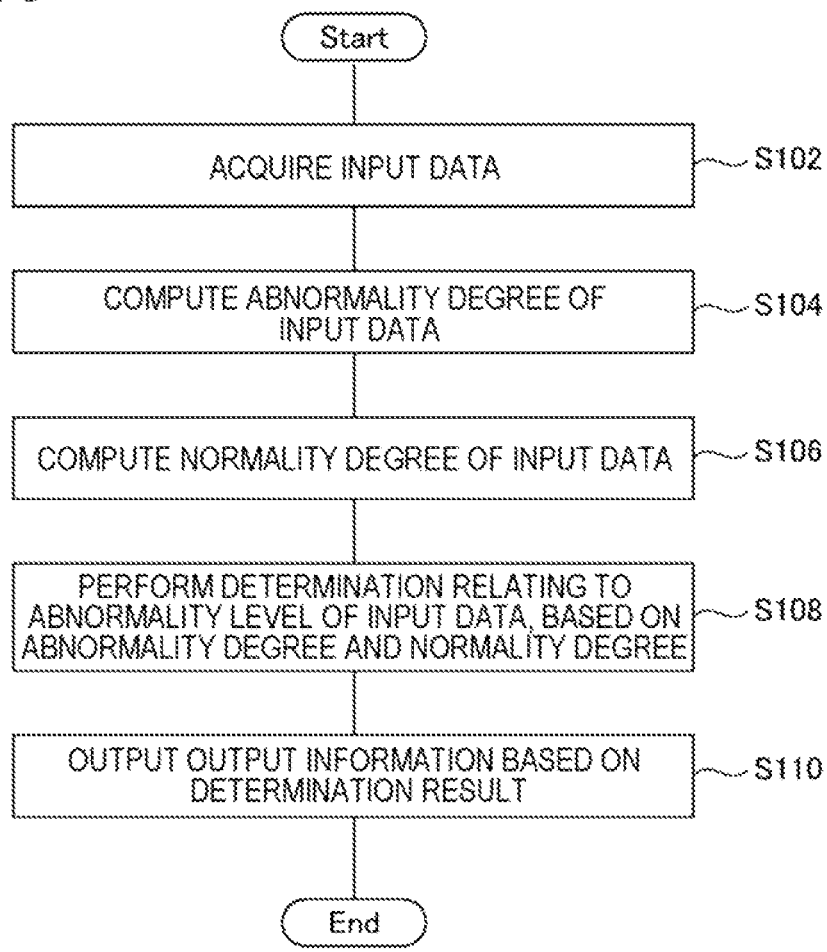
FIG. 3 is a flowchart illustrating a flow of processing executed by the abnormality detection apparatus according to the present example embodiment.

FIG. 3 is a flowchart illustrating a flow of processing executed by the abnormality detection apparatus 100 according to the present example embodiment. The acquisition unit 110 acquires input data (S102). The abnormality degree computation unit 120 computes an abnormality degree of the input data by using a discriminative model (S104). The normality degree computation unit 130 computes a normality degree of the input data by using a normality model (S106). Note that, S104 and S106 may be performed in parallel, or may be performed in any order. The determination unit 140 performs determination using a determination model (S108). The output unit 150 outputs output information based on a determination result (S110).

<Regarding Learning of Model>

Figure 4:
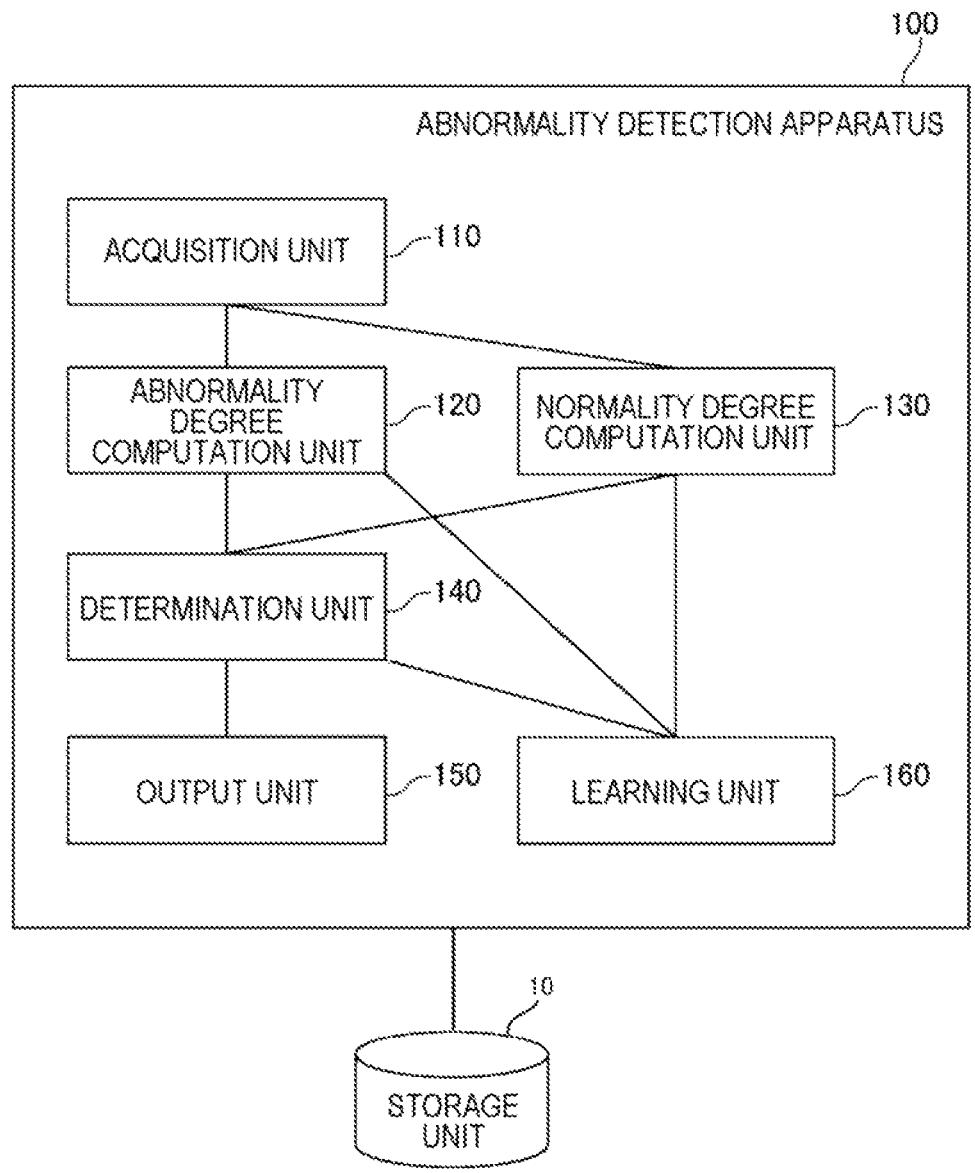
FIG. 4 is a block diagram illustrating a functional configuration of the abnormality detection apparatus including a learning unit.

It is preferred that the abnormality detection apparatus 100 have a function of performing learning of each model by utilizing learning data. Hereinafter, a functional configuration unit that achieves the learning is referred to as a learning unit 160. FIG. 4 is a block diagram illustrating a functional configuration of the abnormality detection apparatus 100 including the learning unit 160.

During learning, the acquisition unit 110 acquires input data prepared for learning. A right answer label is prepared for the input data for learning. A right answer label being associated with input data indicates a normality level or an abnormality level of the input data. For example, a right answer label indicates whether associated input data indicate abnormality input data or normality input data. In addition, for example, a right answer label may be a value (e.g., a continuous value between 0 to 1) representing a degree of normality or a degree of abnormality of associated input data.

For example, information associating input data with a right answer label is previously stored in a storage unit 10 being accessible from the abnormality detection apparatus 100. The storage unit 10 may be achieved by any storage apparatus. The storage unit 10 may be provided inside the abnormality detection apparatus 100, or may be provided outside the abnormality detection apparatus 100. The learning unit 160 acquires, from the storage unit 10, a right answer label being associated with input data acquired by the acquisition unit 110.

In addition, for example, the acquisition unit 110 may acquire a pair of input data and a right answer label. For example, the acquisition unit 110 acquires a pair of input data and a right answer label from the above-described storage unit 10. In addition, for example, the acquisition unit 110 may receive a pair transmitted by another apparatus.

The learning unit 160 performs learning of each model (updating of a parameter of each model) by a comparison between a result of determination (i.e., determination data) performed by the determination unit 140 with regard to input data, and a right answer label being associated with the input data. Thus, during learning, the determination data is supplied to the learning unit 160.

However, determination data supplied to the output unit 150 by the determination unit 140 may be data differing from determination data supplied to the learning unit 160. For example, it is assumed that output information output from the output unit 150 is output information indicating whether input data is normal or abnormal. In this case, for example, in a determination model, each of probabilities representing abnormality and normality with regard to input data is computed, and then determination data representing a higher probability is supplied to the output unit 150. However, it can be said that a probability representing each of abnormality and normality is more useful data than data indicating either one of abnormality and normality. Thus, in such a case, the determination unit 140 may supply the output unit 150 with determination data indicating whether input data is normal or abnormal, and supply the learning unit 160 with, as determination data, a probability that input data represent each of normality and abnormality.

The learning unit 160 updates a discriminative model, a normality model, and a determination model, based on the determination data supplied from the determination unit 140, and the acquired right answer label. Herein, in the learning unit 160, a model being a learning target differs between cases where input data acquired by the acquisition unit 110 are abnormality input data and normality input data.

When input data acquired by the acquisition unit 110 are abnormality input data, the learning unit 160 performs learning of a discriminative model and a determination model. Specifically, the learning unit 160 updates the discriminative model and the determination model in such a way as to minimize an error (hereinafter, a first error) representing a divergence degree between determination data generated with regard to input data, and a right answer label being associated with the input data. For example, when the determination data and the right answer label are both 1 (a value representing abnormality), a divergence degree therebetween becomes 0.

A method of updating the discriminative model and the determination model, based on the first error, is determined according to kinds of the models. For example, it is assumed that a discriminative model is a convolutional neural network, and a determination model is a neural network. In this case, for example, a loss function E illustrated in an equation (1) below is previously defined. The learning unit 160 optimizes parameters of a discriminative model and a determination model in such a way as to minimize the loss function E. Note that, an existing technique may be utilized for a technique for updating a parameter of a neural network by utilizing a loss function. Moreover, definition of a loss function is not limited to the equation (1).

[Mathematical 1]

$$E = -\sum_{n=1}^{N}\sum_{k'=1}^{K} t_{k'n} \log p_{k'}(x_n) \quad (1)$$

In the equation (1), N represents the number of pieces of data, and K represents the number of classes for classification. When input data is classified into abnormality and normality, K=2. Moreover, $t_{k'n}$ in the equation (1) is a vector representing a right answer label for n-th piece of input data. A vector of a right answer label is represented, for example, in such a format as in an equation (2) illustrated below. A vector illustrated in the equation (2) is a so-called 1-of-k vector in which only a k-th element represents 1.

[Mathematical 2]

$$t_n = (0, \ldots, 0, 1, 0, \ldots, 0) \quad (2)$$

Moreover, $P_k(x_n)$ in the equation (1) indicates a probability that n-th piece of input data belongs to a class k'. For example, $P_k(x_n)$ is computed by an equation (3) illustrated below.

[Mathematical 3]

$$P_k(x_n) = \frac{e^{f_k(x_n)}}{\sum_{k'=1}^{K} e^{f_{k'}(x_n)}} \quad (3)$$

In the equation (3), $f_k(x_n)$ is an output value of the class k for n-th piece of input data $x_n$.

When input data is normality input data, the learning unit 160 performs at least learning of a normality model and a determination model. Specifically, the learning unit 160 updates the normality model and the determination model in such a way as to minimize an error (hereinafter, referred to as a second error) representing a divergence degree between determination data generated with regard to input data, and a right answer label being associated with the input data. For example, when the determination data and the right answer label are each 0 (a value representing normality), a divergence degree therebetween becomes 0. Note that, when input data is normality input data, the learning unit 160 may further perform learning of a discriminative model.

A method of updating each model, based on the second error, is determined according to a kind of each model. For example, it is assumed that a discriminative model is a convolutional neural network, a normality model is an autoencoder, and a determination model is a neural network. In this case, the learning unit 160 learns such a parameter as to minimize a divergence degree, with, as learning data, determination data output by the determination unit 140 with regard to input data, and a right answer label being associated with the input data. Note that, a method of learning a parameter may be similar to or differ from a method of learning a parameter, based on the first error.

Whether input data is normality input data or abnormality input data is determined based on a right answer label being associated with the input data. For example, it is assumed that a right answer label indicates whether associated input data is abnormality input data or normality input data. In this case, when the right answer label indicates that the input data is abnormality input data, the learning unit 160 determines that the input data is the abnormality input data. On the other hand, when the right answer label indicates that the input data is normality input data, the learning unit 160 determines that the input data is the normality input data.

In addition, for example, it is assumed that a right answer label represents a degree of normality of input data. In this case, for example, when a value indicated by the right answer label is equal to or more than a predetermined threshold value, the learning unit 160 determines that the input data is normality input data. On the other hand, when a value indicated by the right answer label is less than the threshold value, the learning unit 160 determines that the input data is abnormality input data. When a right answer label represents a degree of abnormality of input data as well, determination may be performed by a comparison with a threshold value.

<<Flow of Processing>>

Figure 5:
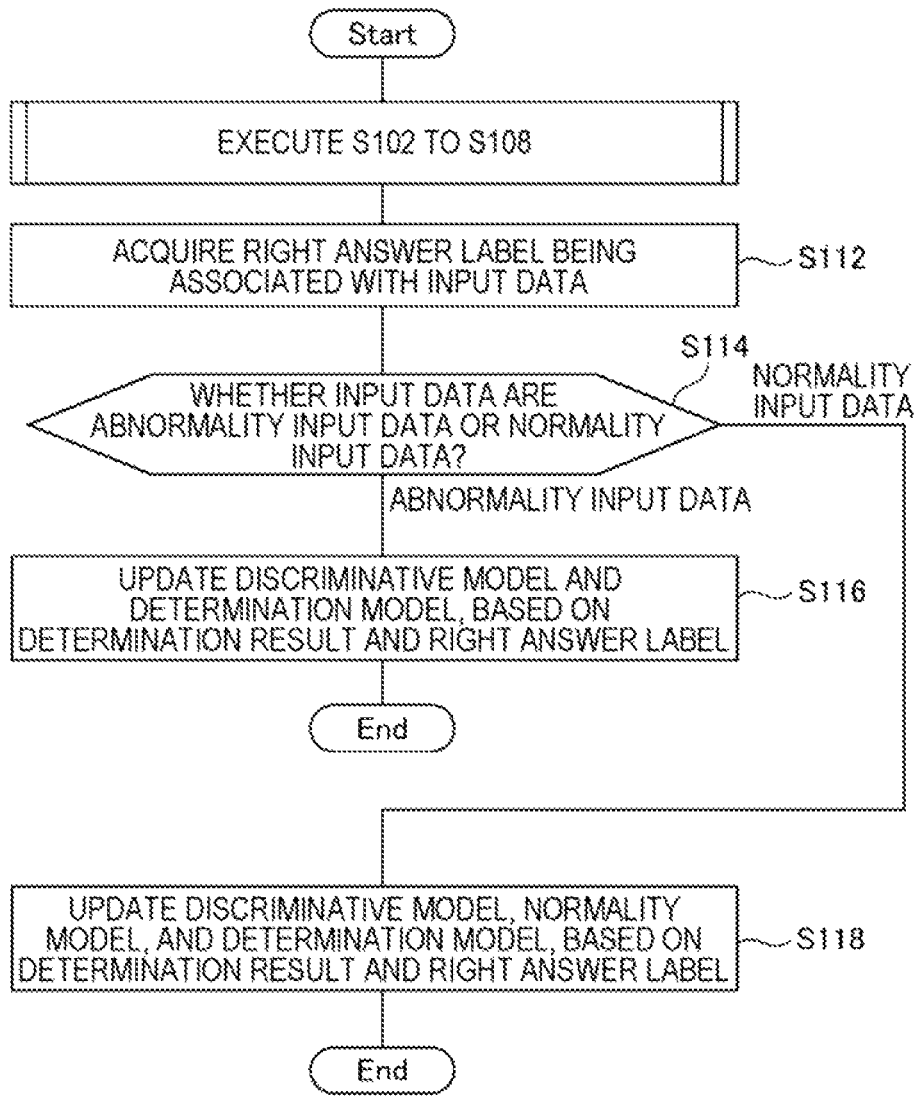
FIG. 5 is a flowchart illustrating a flow of processing executed by the abnormality detection apparatus according to the present example embodiment during learning.

FIG. 5 is a flowchart illustrating a flow of processing executed by the abnormality detection apparatus 100 according to the present example embodiment during learning. Note that, the processing in S102 to S108 is similar to that during operation.

The learning unit 160 acquires a right answer label being associated with input data acquired in S102 (S112). The learning unit 160 determines, based on the acquired right answer label, whether the input data is abnormality input data or normality input data (S114).

When the input data is abnormality input data (S114: abnormality input data), the learning unit 160 updates a discriminative model and a determination model by using the input data (S116). Specifically, the learning unit 160 computes a first error representing a divergence degree between determination data (a determination result regarding the abnormality input data) acquired from the determination unit 140, and the right answer label, and updates the discriminative model and the determination model in such a way as to minimize the first error. In this instance, updating of the discriminative model and the determination model may be performed in parallel, or may be sequentially performed.

When the input data is normality input data (S114: normality input data), the learning unit 160 updates a discriminative model, a normality model, and a determination model by using the input data (S118). Specifically, the learning unit 160 computes a second error representing a divergence degree between determination data (a determination result regarding the normality input data) acquired from the determination unit 140, and a right answer label, and updates the discriminative model, the normality model, and the determination model in such a way as to minimize the second error. In this instance, updating of the models may be sequentially performed, or may be performed in parallel. For example, the learning unit 160 performs updating of the discriminative model and the normality model sequentially or in parallel, and then performs updating of the determination model. Note that, when sequentially updating the discriminative model and the normality model, an order of updating the models may be any order. However, as described above, updating of the discriminative model may not be performed.

Herein, the abnormality detection apparatus 100 executes processing illustrated in FIG. 5 with regard to each of a plurality of pieces of learning data (a pair of input data and a right answer label). Thus, each model is learned by using a plurality of pieces of learning data.

Example Embodiment 2

Figure 6:
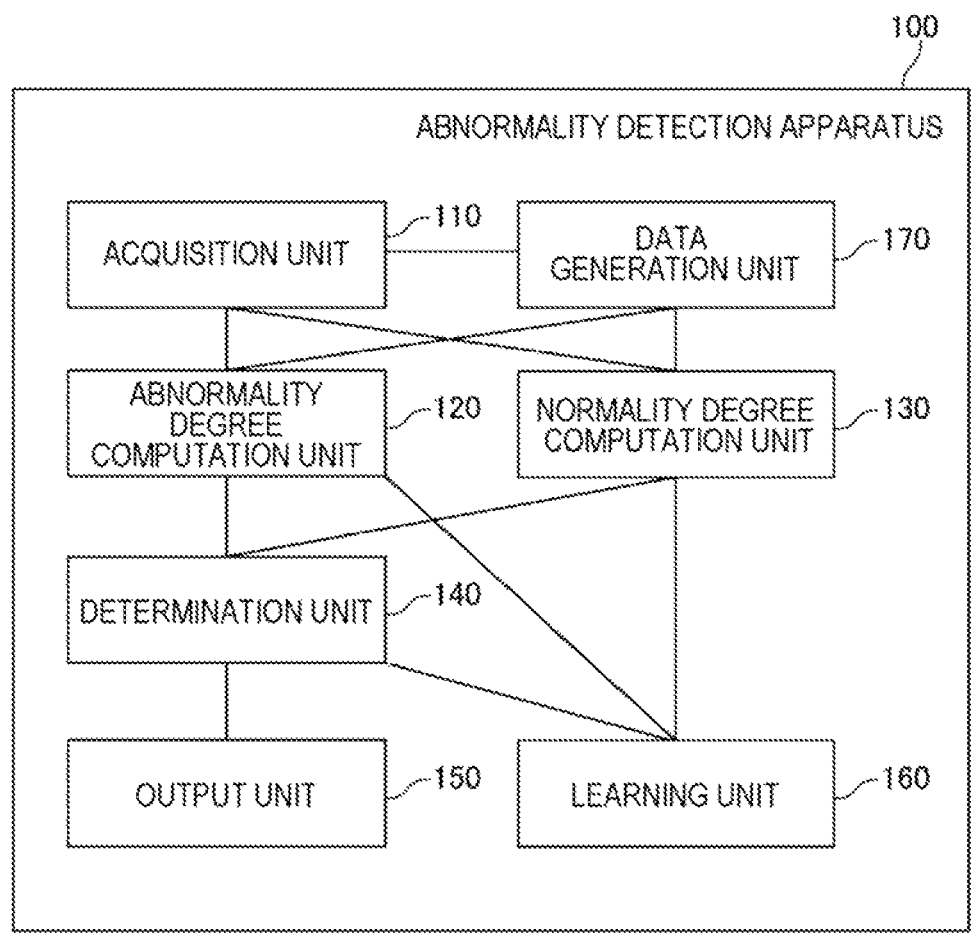
FIG. 6 is a block diagram illustrating a functional configuration of an abnormality detection apparatus according to an example embodiment 2.

FIG. 6 is a block diagram illustrating a functional configuration of an abnormality detection apparatus 100 according to an example embodiment 2. Note that, except for points described below, the abnormality detection apparatus 100 according to the example embodiment 2 has a function similar to that of the abnormality detection apparatus 100 according to the example embodiment 1.

The abnormality detection apparatus 100 according to the example embodiment 2 differs from the abnormality detection apparatus 100 according to the example embodiment 1 in including a data generation unit 170. The data generation unit 170 generates data (hereinafter, pseudo data) being analogous to input data acquired by an acquisition unit 110. Thus, the abnormality detection apparatus 100 according to the example embodiment 2 can perform learning of a model by using more pieces of data than pieces of input data previously prepared for learning.

For example, the data generation unit 170 may generate pseudo data from input data and a random number given by any method, or may generate pseudo data from input data and predetermined data to be a criterion. Note that, a method of generating data by machine learning (DCGAN: Deep Convolutional Generative Adversarial Network) described in, for example, Non-Patent Document 1 may be used for a method of generating new data being analogous to input data from input data and a random number or data to be a criterion. Note that, a right answer label of generated data is a right answer label being associated with input data utilized for the generation. Note that, pseudo data generated based on one piece of input data may be one piece of pseudo data or may be a plurality of pieces of pseudo data.

The data generation unit 170 may temporarily store the generated data and the right answer label thereof in a storage unit 10, or may directly supply the generated data and the right answer label thereof to an abnormality degree computation unit 120, a normality degree computation unit 130, and the learning unit 160.

<Example of Hardware Configuration>

A configuration of hardware achieving the abnormality detection apparatus 100 according to an example embodiment 2 is represented by, for example, FIG. 2, similarly to the abnormality detection apparatus 100 according to the example embodiment 1. However, a program module achieving the function of the abnormality detection apparatus 100 according to the example embodiment 2 is recorded in a storage device 1080 according to the example embodiment 2.

<Flow of Processing>

Figure 7:
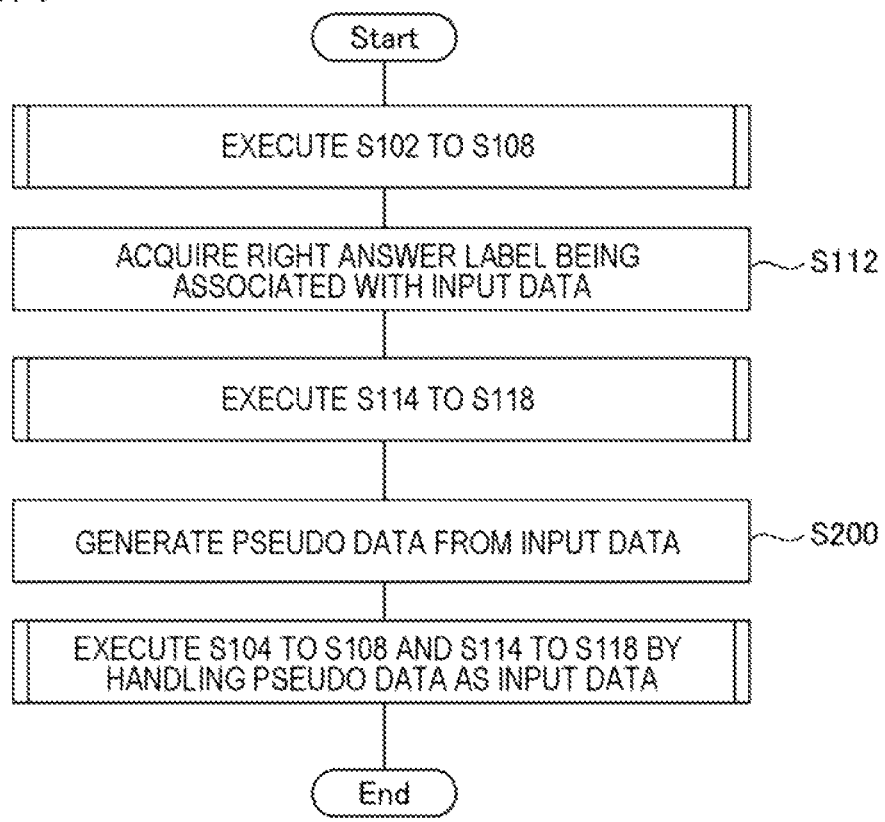
FIG. 7 is a flowchart illustrating a flow of processing executed by the abnormality detection apparatus according to the example embodiment 2.

FIG. 7 is a flowchart illustrating a flow of processing executed by the abnormality detection apparatus 100 according to the example embodiment 2. First, the abnormality detection apparatus 100 executes processing in S102 to S108 and S112 to S118. Thus, learning using input data acquired by the acquisition unit 110 is performed.

Thereafter, the data generation unit 170 generates pseudo data by using the input data acquired by the acquisition unit 110 (S200). The abnormality detection apparatus 100 executes the processing in S102 to S108 and S112 to S118 by handling the generated pseudo data as input data. Thus, learning using the pseudo data generated by the data generation unit 170 is performed.

Note that, as described above, pseudo data generated from input data may be a plurality of pieces of pseudo data. In this case, the abnormality detection apparatus 100 executes the processing in S102 to S108 and S112 to S118 with regard to each piece of pseudo data. Thus, learning using each piece of pseudo data is performed.

Moreover, generation of pseudo data may be performed prior to learning by the learning unit 160. For example, the data generation unit 170 sequentially reads a pair of input data and a right answer label input to the storage unit 10. Then, the data generation unit 170 generates pseudo data with regard to the read input data, and writes the generated pseudo data into the storage unit 10 in association with the right answer label read together with the input data. After increasing learning data stored in the storage unit 10 in this way, the abnormality detection apparatus 100 executes learning of a model by executing a series of processing illustrated in FIG. 5 with regard to each piece of learning data stored in the storage unit 10.

Example Embodiment 3

Figure 8:
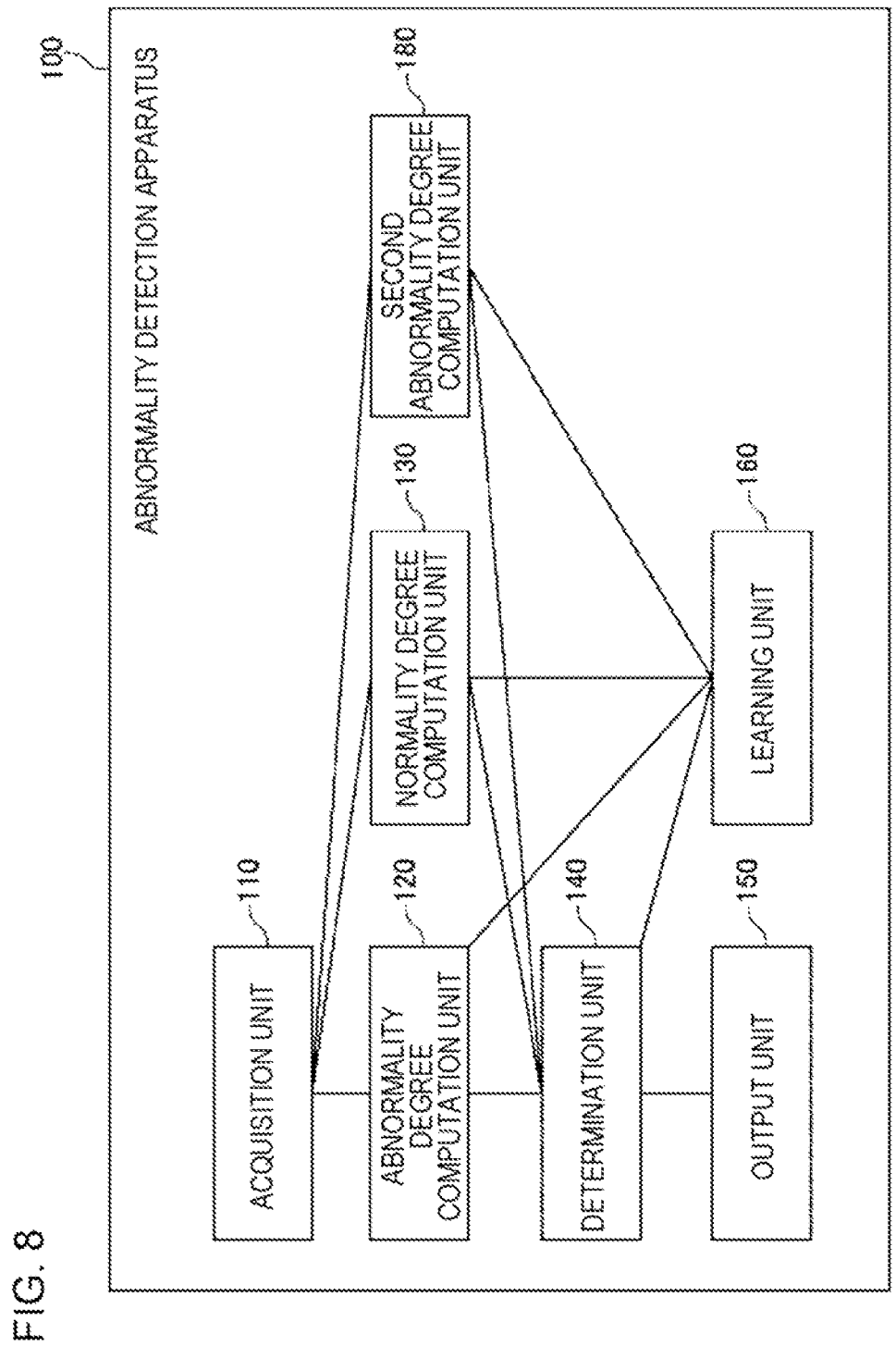
FIG. 8 is a diagram illustrating a functional configuration of an abnormality detection apparatus according to an example embodiment 3.

FIG. 8 is a diagram illustrating a functional configuration of an abnormality detection apparatus 100 according to an example embodiment 3. Except for points described below, the abnormality detection apparatus 100 according to the example embodiment 3 has a function similar to that of the abnormality detection apparatus 100 according to the example embodiment 1 or 2.

The abnormality detection apparatus 100 according to the example embodiment 3 further includes a second abnormality degree computation unit 180. The second abnormality degree computation unit 180 has an abnormality model. The second abnormality degree computation unit 180 computes a second abnormality degree with regard to input data acquired by an acquisition unit 110.

The abnormality model differs from a discriminative model in being always learned with only abnormality input data. The abnormality model is achieved by any model being capable of extracting any feature included in input data. For example, one example of an abnormality model is an autoencoder.

A determination unit 140 according to the example embodiment 3 acquires an abnormality degree, a normality degree, and a second abnormality degree from an abnormality degree computation unit 120, a normality degree computation unit 130, and the second abnormality degree computation unit 180, respectively. Then, the determination unit 140 performs determination relating to an abnormality level of input data, based on the three pieces of data.

The abnormality detection apparatus 100 according to the example embodiment 3 can extract a large variety of features from input data, by further using an abnormality model. Then, abnormality detection using the feature is performed. Thus, accuracy of abnormality detection can be further improved.

A learning unit 160 performs learning of each of a discriminative model included in the abnormality degree computation unit 120, a normality model included in the normality degree computation unit 130, a determination model included in the determination unit 140, and an abnormality model included in the second abnormality degree computation unit 180.

When input data acquired by the acquisition unit 110 are abnormality input data, the learning unit 160 computes an above-described first error, based on a comparison between the input data, and a right answer label being associated with the input data. Then, the learning unit 160 performs learning (updating of a parameter) of the discriminative model, the determination model, and the abnormality model in such a way as to minimize the computed first error.

On the other hand, when input data acquired by the acquisition unit 110 are normality input data, the learning unit 160 computes an above-described second error, based on a comparison between the input data, and a right answer label being associated with the input data. Then, the learning unit 160 performs learning of the discriminative model, the normality model, and the determination model in such a way as to minimize the computed second error. However, as described above, learning of the discriminative model may not be performed.

<Example of Hardware Configuration>

A configuration of hardware achieving the abnormality detection apparatus 100 according to the example embodiment 3 is represented by, for example, FIG. 2, similarly to the abnormality detection apparatus 100 according to the example embodiment 1. However, a program module achieving the function of the abnormality detection apparatus 100 according to the example embodiment 3 is recorded in a storage device 1080 according to the example embodiment 3.

<Flow of Processing>

Figure 9:
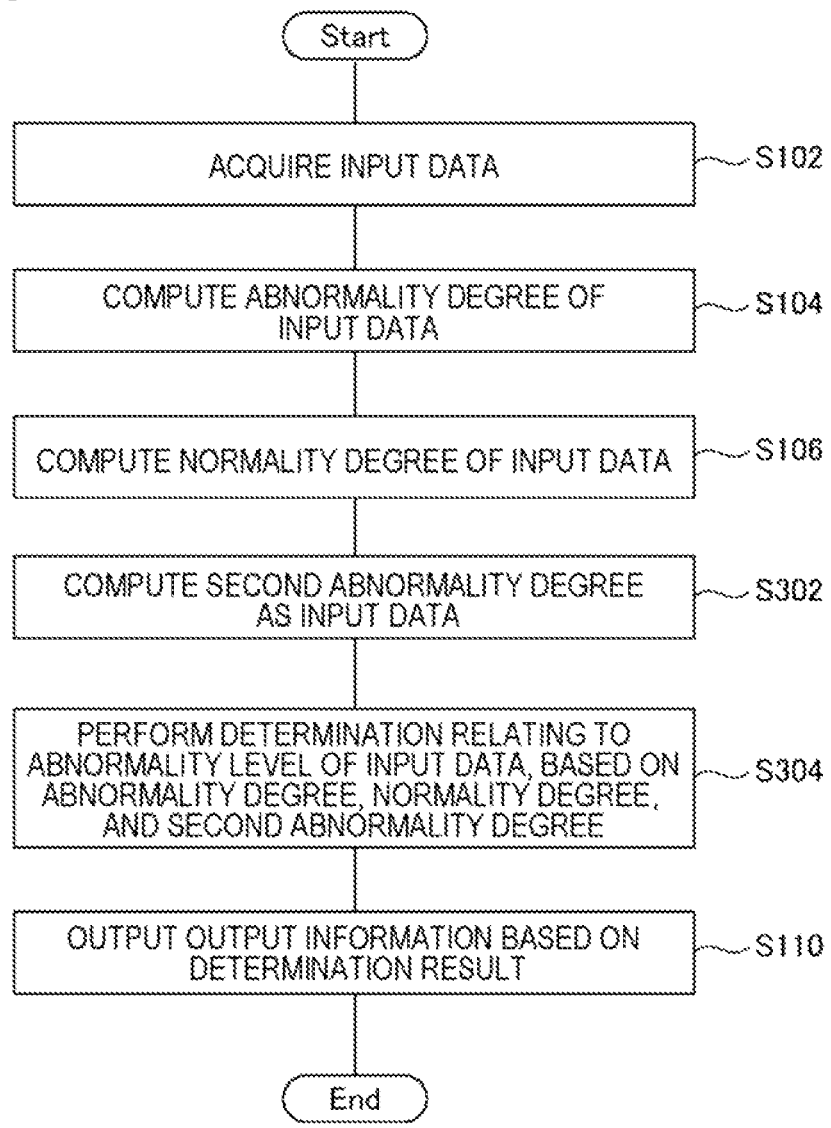
FIG. 9 is a flowchart illustrating a flow of processing executed by the abnormality detection apparatus according to the example embodiment 3 during operation.

FIG. 9 is a flowchart illustrating a flow of processing executed by the abnormality detection apparatus 100 according to the example embodiment 3 during operation. The flowchart in FIG. 9 is similar to the flowchart in FIG. 3 except for having S302, and having S304 instead of S108.

In S302, the second abnormality degree computation unit 180 computes a second abnormality degree, based on input data. In S304, the determination unit 140 performs determination relating to an abnormality level of the input data, based on an abnormality degree, a normality degree, and the second abnormality degree.

FIG. 10 is a flowchart illustrating a flow of processing executed by the abnormality detection apparatus 100 according to the example embodiment 3 during learning. The flowchart in FIG. 10 is similar to the flowchart in FIG. 5 except that determination relating to an abnormality level of input data is performed by executing S102 to S106, S302, and S304, and except for having S306 instead of S116. In S306, the learning unit 160 performs learning of a discriminative model, an abnormality model, and a determination model. Note that updating of a plurality of models may be sequentially performed, or may be performed in parallel, as described in the example embodiment 1.

While the example embodiments of the present invention have been described above with reference to the drawings, the example embodiments are exemplifications of the present invention, and a combination of the above-described example embodiments, and various configurations other than each of the above-described example embodiments can also be adopted.

For example, learning of a discriminative model, a normality model, an abnormality model, and a determination model may be performed by using pseudo data, by combining the example embodiments 2 and 3.

Moreover, data supplied to a determination model from another model may be not a final output result such as an abnormality degree but intermediate data. For example, for a determination model, intermediate data acquired in a computation process of an abnormality degree is supplied to the determination model, instead of supplying an abnormality degree to the determination model. When a discriminative model is a neural network, intermediate data may be an output from any intermediate layer, for example. Further, one or more pieces of intermediate data (e.g., data output from intermediate layers differing from each other) and an abnormality degree may be supplied from a discriminative model to a determination model. The same also applies to data supplied from a normality model or an abnormality model to a determination model.

Some or all of the above-described example embodiments can be described as, but not limited to, the following supplementary notes.

1. An abnormality detection apparatus including:

an acquisition unit that acquires input data;

an abnormality degree computation unit that has a discriminative model for computing an abnormality degree of input data, inputs the acquired input data to the discriminative model, and thereby computes an abnormality degree of the input data;

a normality degree computation unit that has a normality model for computing a normality degree of input data, inputs the acquired input data to the normality model, and thereby computes a normality degree of the input data;

a determination unit that has a determination model for performing determination relating to an abnormality level of the input data, inputs data being output from each of the discriminative model and the normality model to the determination model, and thereby performs determination relating to an abnormality level of the acquired input data; and an output unit that outputs output information based on a result of the determination.

2. The abnormality detection apparatus according to supplementary note 1., wherein the input data is image data, and the discriminative model, the normality model, and the determination model are a convolutional neural network, an autoencoder, and a neural network, respectively.

3. The abnormality detection apparatus according to supplementary note 1. or 2., further including a learning unit that acquires a right answer label being associated with the acquired input data, and performs updating of the discriminative model, the normality model, and the determination model by using a result of determination by the determination unit, and the right answer label, wherein the learning unit determines, by using the right answer label, whether the acquired input data represent abnormality or normality, performs updating of the discriminative model and the determination model when the acquired input data represent abnormality, and performs updating of the normality model and the determination model when the acquired input data represent normality.

4. The abnormality detection apparatus according to supplementary note 3., wherein the learning unit further performs updating of the discriminative model when the acquired input data represent normality.

5. The abnormality detection apparatus according to supplementary note 3. or 4., further including a data generation unit that generates pseudo data being analogous to the input data by using the acquired input data, wherein the pseudo data is input to the abnormality degree computation unit and the normality degree computation unit as input data, and the learning unit performs updating of the discriminative model, the normality model, and the determination model by using the acquired right answer label, and a result of determination acquired from the determination unit with regard to the pseudo data.

6. The abnormality detection apparatus according to any one of supplementary notes 3. to 5., further including a second abnormality degree computation unit that has an abnormality model for computing a second abnormality degree with regard to input data, inputs the acquired input data to the abnormality model, and thereby computes a second abnormality degree of the input data, wherein the determination unit inputs data being output from each of the discriminative model, the normality model, and the abnormality model to the determination model, and thereby performs determination relating to an abnormality level of the acquired input data, and the learning unit further performs learning of the abnormality model when the acquired input data represent abnormality.

7. A control method executed by a computer, including:

an acquisition step of acquiring input data;

an abnormality degree computation step of having a discriminative model for computing an abnormality degree of input data, computing an abnormality degree of the input data by inputting the acquired input data to the discriminative model;

a normality degree computation step of having a normality model for computing a normality degree of input data, computing a normality degree of the input data by inputting the acquired input data to the normality model;

a determination step of having a determination model for performing determination relating to an abnormality level of the input data, performing determination relating to an abnormality level of the acquired input data by inputting data being output from each of the discriminative model and the normality model to the determination model; and an output step of outputting output information based on a result of the determination.

8. The control method according to supplementary note 7., wherein the input data is image data, and the discriminative model, the normality model, and the determination model are a convolutional neural network, an autoencoder, and a neural network, respectively.

9. The control method according to supplementary note 7. or 8., further including:

a learning step of performing learning by acquiring a right answer label being associated with the acquired input data, and performing updating of the discriminative model, the normality model, and the determination model by using a result of determination by the determination step, and the right answer label;

in the learning step, determining, by using the right answer label, whether the acquired input data represent abnormality or normality;

performing updating of the discriminative model and the determination model when the acquired input data represent abnormality; and performing updating of the normality model and the determination model when the acquired input data represent normality.

10. The control method according to supplementary note 9., further including, in the learning step, further performing updating of the discriminative model when the acquired input data represent normality.

11. The control method according to supplementary note 9. or 10., further including:

a data generation step of generating pseudo data being analogous to the input data by using the acquired input data;

the pseudo data being input as input data in the abnormality degree computation step and the normality degree computation step; and, in the learning step, performing updating of the discriminative model, the normality model, and the determination model by using the acquired right answer label, and a result of determination acquired in the determination step with regard to the pseudo data.

12. The control method according to any one of supplementary notes 9. to 11., further including:

a second abnormality degree computation step of having an abnormality model for computing a second abnormality degree with regard to input data, computing a second abnormality degree of the input data by inputting the acquired input data to the abnormality model;

in the determination step, performing determination relating to an abnormality level of the acquired input data by inputting data being output from each of the discriminative model, the normality model, and the abnormality model to the determination model; and, in the learning step, further performing learning of the abnormality model when the acquired input data represent abnormality.

13. A program causing a computer to execute each step in the control method according to any one of supplementary notes 7. to 12.

What is claimed is:

1. An abnormality detection apparatus comprising:
at least one memory storing instructions; and
at least one processor configured to execute the instructions to:
acquire input data;
input the acquired input data to a discriminative model for computing an abnormality degree of the input data, and cause the discriminative model to compute the abnormality degree of the input data;
input the acquired input data to a normality model for computing a normality degree of the input data, and cause the normality model to compute the normality degree of the input data;
input the abnormality degree and the normality degree respectively computed and output from the discriminative model and the normality model to a determination model for performing a determination relating to an abnormality level of the input data based on the abnormality degree and the normality degree, and cause the determination model to perform the determination relating to the abnormality level of the acquired input data; and
output output information based on a result of the determination, wherein
the input data is image data,
the discriminative model, the normality model, and the determination model are a convolutional neural network, an autoencoder, and a neural network, respectively, and
the at least one processor is further configured to execute the instructions to further:
acquire a right answer label associated with the acquired input data, and perform updating of the discriminative model, the normality model, and the determination model by using a result of the determination and the right answer label;
determine, by using the right answer label, whether the acquired input data represents abnormality or normality;
perform updating of the discriminative model and the determination model when the acquired input data represent abnormality; and
perform updating of the normality model and the determination model when the acquired input data represent normality.

2. The abnormality detection apparatus according to claim 1, wherein
the at least one processor is further configured to execute the instructions to perform updating of the discriminative model when the acquired input data represent normality.

3. The abnormality detection apparatus according to claim 1, wherein the at least one processor is further configured to execute the instructions to:
generate pseudo data analogous to the input data by using the acquired input data, the pseudo data input to the discriminative model and the normality model as the input data; and
perform updating of the discriminative model, the normality model, and the determination model by using the acquired right answer label, and a result of the determination acquired by performing the determination with regard to the pseudo data.

4. The abnormality detection apparatus according to claim 1, wherein the at least one processor is further configured to execute the instructions to:
input the acquired input data to an abnormality model for computing a second abnormality degree with regard to the input data, and cause the abnormality model to compute the second abnormality degree of the input data;
input the abnormality degree, the normality degree, and the second abnormality degree respectively computed and output from the discriminative model, the normality model, and the abnormality model to the determination model, and cause the determination model to perform the determination relating to an abnormality level of the acquired input data based on the abnormality degree, the normality degree, and the second abnormality degree; and
perform learning of the abnormality model when the acquired input data represent abnormality.

5. A control method executed by a computer, the computer having a discriminative model for computing an abnormality degree of input data, a normality model for computing a normality degree of input data, and a determination model for performing a determination relating to an abnormality level of the input data based on the abnormality degree and the normality degree, the control method comprising:
acquiring the input data;
computing the abnormality degree of the input data by inputting the acquired input data to the discriminative model;
computing the normality degree of the input data by inputting the acquired input data to the normality model;
performing a determination relating to the abnormality level of the acquired input data by inputting the abnormality degree and the normality degree respectively computed and output from the discriminative model and the normality model to the determination model; and
outputting output information based on a result of the determination, wherein
the input data is image data,
the discriminative model, the normality model, and the determination model are a convolutional neural network, an autoencoder, and a neural network, respectively, and
the control method further comprises:
performing learning by acquiring a right answer label associated with the acquired input data, and performing updating of the discriminative model, the normality model, and the determination model by using a result of the determination and the right answer label;
in the learning:
determining, by using the right answer label, whether the acquired input data represents abnormality or normality;
performing updating of the discriminative model and the determination model when the acquired input data represent abnormality; and
performing updating of the normality model and the determination model when the acquired input data represent normality.

6. The control method according to claim 5, further comprising,
in the learning, further performing updating of the discriminative model when the acquired input data represent normality.

7. The control method according to claim 5, further comprising:
- generating pseudo data analogous to the input data by using the acquired input data;
- the pseudo data input as the input data in the computing abnormality degree and the computing normality degree; and
- in the learning, performing updating of the discriminative model, the normality model, and the determination model by using the acquired right answer label, and a result of the determination acquired by performing the determination with regard to the pseudo data.

8. The control method according to claim 5, the computer having an abnormality model for computing a second abnormality degree with regard to input data, the control method further comprising:
- computing the second abnormality degree of the input data by inputting the acquired input data to the abnormality model;
- in the performing of the determination, performing the determination relating to the abnormality level of the acquired input data by inputting the abnormality degree, the normality degree, and the second abnormality degree respectively computed and output by the discriminative model, the normality model, and the abnormality model to the determination model; and
- in the learning, performing the learning of the abnormality model when the acquired input data represent abnormality.

9. A non-transitory computer-readable storage medium storing a program causing a computer to execute the control method according to claim 5.

* * * * *